United States Patent [19]

Allen

[11] Patent Number: 4,637,141
[45] Date of Patent: Jan. 20, 1987

[54] MULTI-PURPOSE COLLAPSIBLE HAND SAW

[76] Inventor: Thomas P. Allen, 8211 Purdue, Tyler, Tex. 75703

[21] Appl. No.: 830,531

[22] Filed: Feb. 18, 1986

[51] Int. Cl.$^4$ .............................................. B27B 21/02
[52] U.S. Cl. ......................................... 30/512; 30/506
[58] Field of Search ...................... 30/166 R, 506, 507, 30/517, 525, 512

[56] References Cited

U.S. PATENT DOCUMENTS

| 177,243 | 5/1876 | Hayton et al. | 30/506 |
| 3,149,652 | 9/1964 | Swenson | 30/512 |
| 3,724,519 | 4/1973 | McCord | 30/512 |
| 3,905,409 | 9/1975 | Bradley | 30/512 |
| 3,908,726 | 9/1975 | Swenson | 30/512 |

Primary Examiner—Douglas D. Watts
Attorney, Agent, or Firm—Bill D. McCarthy

[57] ABSTRACT

A multi-purpose saw is provided which can be selectively positionable in one of an assembled working mode and a storage mode. The saw comprises a hollow handle, a hollow back bar, a saw blade, a blade stop assembly and a hook retainer assembly for interconnecting the handle and the back bar of the saw in one of the assembled working mode and the storage mode. The hollow handle, is provided with longitudinally aligned first and second blade slots, and a plurality of apertures disposed near the opposite end thereof, a pair of said apertures being spatially disposed in axial alignment on opposing sides of the handle and in substantial longitudinal alignment with the first and second blade slots. The back bar, also an elongated tubular member and having an outside diameter less than the inside diameter of the handle, is provided with a concave groove on one end thereof for mating abuttment with a portion of the handle when the saw is in the assembled working mode. The opposing end of the back bar is provided with a back bar blade slot and a plurality of apertures, a pair of said apertures being axially disposed in the upper and lower sides of the back bar, a third of said apertures being disposed in the upper side of the back bar and in substantial longitudinal alignment with the back bar blade slot. The saw blade is positionable within the first and second blade slots of the handle and the back bar blade slot and secured therein by the blade stop assembly supported by the first and second end portions of the saw blade. The hook retainer assembly interconnects the handle and back bar together via the apertures therein when the saw is in the assembled working mode and the storage mode.

10 Claims, 14 Drawing Figures

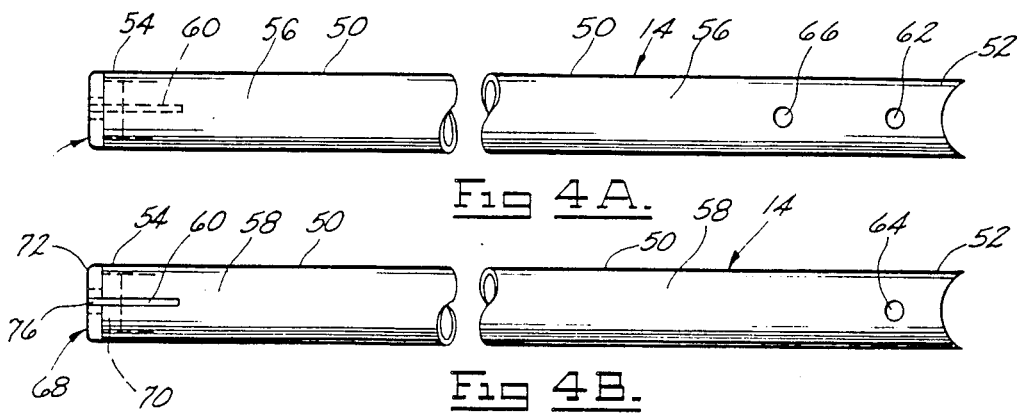
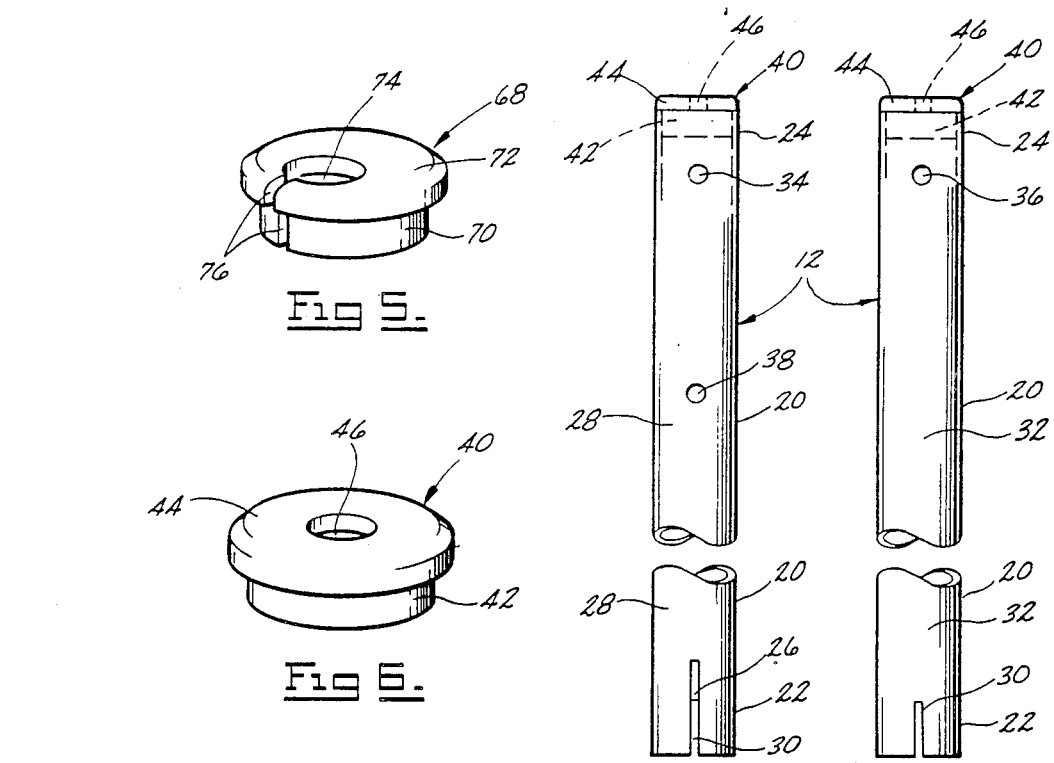
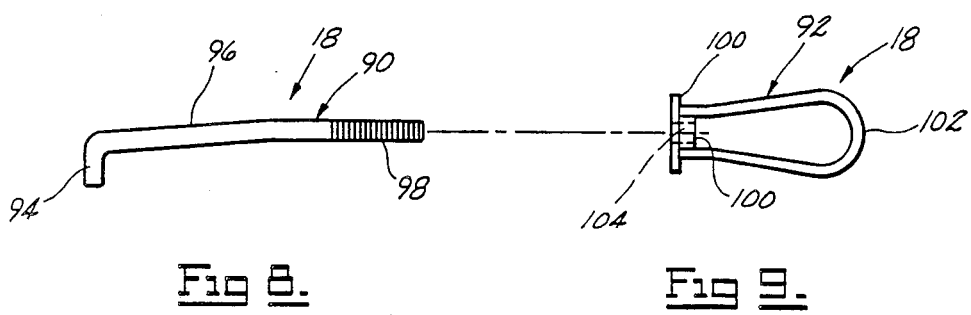

MULTI-PURPOSE COLLAPSIBLE HAND SAW

BACKGROUND OF THE INVENTION

1. Field of the Invention

The present invention relates to the field of hand saws and more particularly, but not by way of limitation, to a multi-purpose hand saw having a working mode and a collapsed storage mode capable of storing a plurality of saw blades for cutting wood, meat and metal.

2. Discussion of Prior Art

Collapsible hand saws have heretofore been known as desirable equipment for hunters, campers and the like. Several such collapsible saws have heretofore been proposed by the prior art. Typical of such prior art devices are those disclosed in Swenson, U.S. Pat. No. 3,149,652, and Bradley, U.S. Pat. No. 3,905,409.

U.S. Pat. No. 3,149,652, discloses a collapsible saw comprising a hollow back bar, a tubular handle and a saw blade. The hollow back bar is provided with a longitudinal extending slot which extends the length thereof; and the tubular handle is provided with a transverse opening at its upper end for snuggly receiving one end of the back bar when the saw is in the assembled position. One end of the saw blade is pivotally connected to the distal end of the back bar via a pivot pin, and the other end of the saw blade is pivotally connected to the handle via a threaded handle pin and a pivot pin. The interconnection of the back bar, the handle and the saw blade is such that in the assembled position the handle becomes slightly canted with relation to the back bar, thus securely binding the back bar and tightening the saw blade for sawing use. In the collapsed mode, the saw blade is passed through the longitudinally extending slot of the back bar so as to be received in the hollow of the back bar, which in turn is inserted into the hollow of a handle and secured thereto with the handle pin extensive through pressed-together ends of the handle and a wing nut.

Bradley, U.S. Pat. No. 3,905,409, teaches a collapsible hand saw which comprises a saw blade, a brace bar, a handle, and a threaded stud. In the utility mode, a dog assembly, supported on one end of the saw blade, hooks over the outer end of the brace bar. The threaded stud is pivotally attached to the other end of the saw blade via a pin and the stud extends through a pair of axially aligned holes in the handle for attaching the other end of the saw blade to the handle as illustrated in FIG. 2 of the reference. In the collapsed mode, the saw blade is maintained in a recess of the I-beam brace bar which is partially received in the hollow of the handle and retained therein via a wing nut and the dog assembly which is only partially receivable in the recess of the I-beam brace bar.

SUMMARY OF THE INVENTION

The present invention provides an improved multi-purpose saw which is selectively positionable in one of an assembled working mode and a storage mode, while permitting the user thereof to easily and quickly change the saw blade. In particular, the multi-purpose, collapsible hand saw of the present invention comprises a hollow handle, a hollow back bar adapted to matingly abut a portion of the handle member when the saw is in the assembled working mode, a saw blade extendible between the back bar and the handle when the saw is in the assembled mode, a blade stop assembly supported on each end of the saw blade for connecting the saw blade to the handle and the back bar, and a hook retainer assembly for interconnecting the handle and back bar together when same are in one of the assembled mode and the storage mode.

The handle, an elongated hollow tubular member having opposing first and second ends, is characterized as having a first blade slot formed in the first end on one side thereof and a second blade slot formed in the first end of the opposing side thereof. The second blade slot, which is provided with a length less than the first blade slot, is longitudinally aligned with the first blade slot. The handle is further provided with a plurality of apertures disposed near the second end thereof, a pair of the apertures being spatially disposed in axial alignment on opposing side of the handle and in substantial longitudinal alignment with the first and second blade slots, and a third aperture being disposed on one side of the handle in substantial longitudinal alignment with the first blade slot.

The back bar of the saw, also an elongated hollow tubular member, is characterized as having opposing first and second ends and upper and lower sides. The first end of the back bar is configured with a concave groove for mating abutment with the handle when the saw is in the assembled mode. The back bar is provided with an outside diameter less than the inside diameter of the handle so that the back bar is partially receivable in the hollow of the handle when the saw is in the storage mode. The back bar is further provided with a back bar blade slot formed in the lower side of the back bar at the second end thereof, and a plurality of apertures disposed near the concave first end. A pair of the apertures are axially aligned in the upper and lower sides of the back bar and a third aperture is disposed in the upper side of the back bar and in substantial longitudinal alignment with the back bar blade slot.

The saw blade, which is characterized as having a first end portion, a medial portion and an opposed second end portion, is provided with a blade stop assembly supported on the first and second end portions of the saw blade for securing the saw blade to the handle and the back bar when the saw is in the assembled mode. Thus, the saw blade can readily be secured to the handle and the back bar via the blade slots and back bar blade slot and the blade stop assembly of the saw blade so that the medial portion of the saw blade spans between the handle and the back bar.

The apertures provided in the handle and the back bar are adapted to receive the hook retainer assembly so that the back bar and the handle, in combination with the saw blade, can be stabilized in the operating mode; and the apertures in the handle and back bar are adapted to receive the hook retainer assembly so that same can be secured in the storage mode.

An object of the present invention is to provide an improved hand saw which may be easily and simply moved between an assembled working mode and a collapsed, storage mode.

Another object of the present invention, while achieving the above stated object, is to provide a hand saw which has an absolute minimum number of parts and which is extremely compact when collapsed.

Another object of the present invention, while achieving the above stated objects, is to provide an improved collapsible hand saw which is extremely rigid when in the assembled, operating mode, and which enables the user to readily change the saw blade to one adapted to cut wood, meat or metal.

Another object of the present invention, while achieving the above stated objects, is to provide a hand saw which may be collapsed and the blade, along with accessory blades, stored within the saw so that the blades are entirely concealed and contained within the saw when same is in its collapsed, storage mode.

Other objects, advantages and features of the present invention will become clear from the following detailed description of the preferred embodiment when read in conjunction with the drawings and appended claims.

BRIEF DESCRIPTION OF THE DRAWINGS

FIG. 4A is a top, broken plan view of a back bar of the multi-purpose hand saw; FIG. 4B is a bottom, broken plan view of the back bar member.

FIG. 5 is a perspective view of a closure member for a distal end of the back bar.

FIG. 6 is a perspective view of a closure member for one end of the handle member.

FIG. 7A is a broken, side view of the handle; FIG. 7B is a broken, side view of an opposite side of the handle.

FIG. 8 is a side view of a hook retainer member of a hook retainer assembly for connecting the back bar and handle of the multi-purpose hand saw in one of an assembled mode and storage mode.

FIG. 9 is a side view of a nut ring member of the hook retainer assembly.

DESCRIPTION OF PREFERRED EMBODIMENTS

Figure 1:
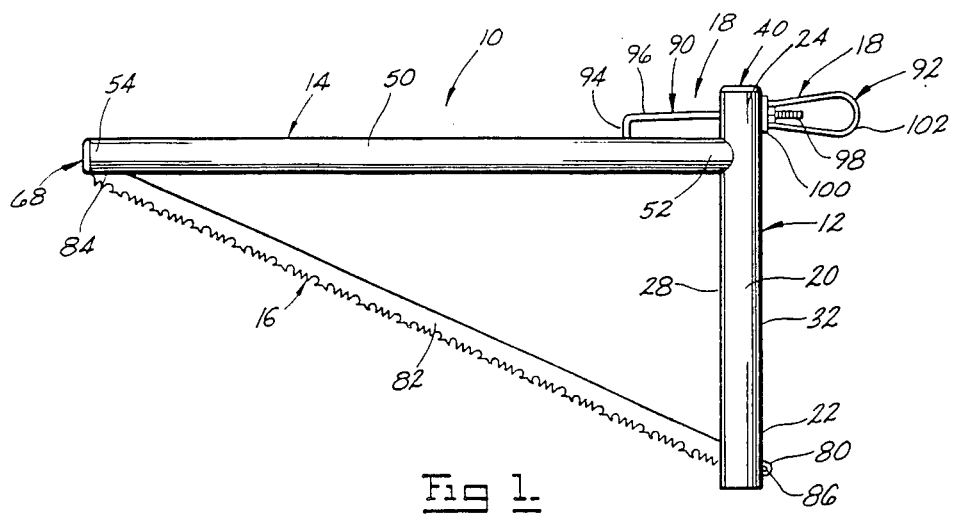
FIG. 1 is a side elevational view of the multi-purpose hand saw of the present invention in its utility mode.
Figure 2:
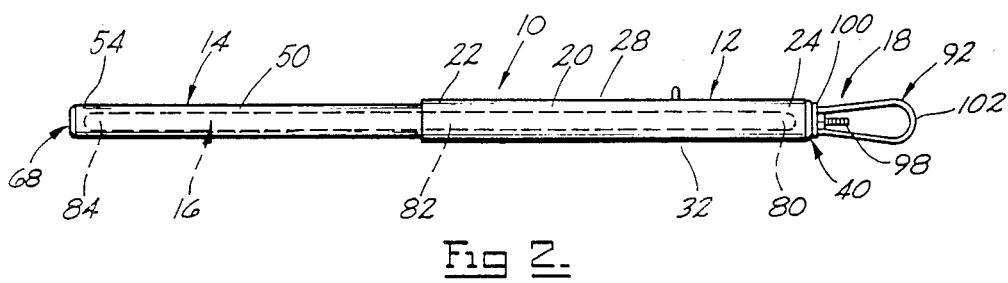
FIG. 2 is a side elevational view of the multi-purpose hand saw in its compact storage mode.

Referring now to the drawings generally, and particularly to FIGS. 1 and 2, shown therein is a multi-purpose collapsible hand saw 10 of the present invention. The hand saw 10 comprises a handle 12, a back bar 14, a saw blade 16 and a hook retainer assembly 18 for connecting the handle 12 to the back bar 14 when the saw is in an assembled working mode (FIG. 1), or a collapsed, storage mode (FIG. 2). The handle 12 and the back bar 14 are fabricated of tubular materials so that the outside diameter of the back bar 14 is less than the inside diameter of the handle 12. Thus, when the saw 10 is positioned in the collapsed mode, the back bar 14 is partially receivable in the hollow of the handle 12 and secured therein by the hook retainer assembly 18 as will be more fully described hereinafter.

As shown in FIGS. 1, 2, 7A and 7B, the handle 12 comprises an elongated tubular member 20 having opposing first and second ends 22 and 24. A longitudinally extending first blade slot 26 is formed in the first end 22 of the tubular member 20 in one side 28 thereof; and a longitudinally extending second blade slot 30 is formed in the first end 22 of the tubular member in an opposing side 32 thereof such that the first and second blade slots 26, 30 are axially aligned substantially as shown in FIG. 7A. The second blade slot 30 is provided with a longitudinal length at least equal to the height of the saw blade 16; whereas the first blade slot 26 is provided with a longitudinal length greater than the height of the saw blade 16. Thus, the longitudinal length of the second blade slot 30 is less than the longitudinal length of the first saw blade slot 26. The longitudinal length of the first blade slot 26 can vary, but will be dependent upon the length of the tubular member 20 of the handle 12, the length of the back bar 14 and the angular disposition of the saw blade 16 as same spans between the handle 12 and the back bar 14 when the handsaw 10 is in the assembled working mode.

The tubular member 20 of the handle 12 is further provided with a plurality of apertures 34, 36 and 38 disposed near the second end 24 thereof. Apertures 34, 36 are spatially disposed in axial alignment on opposing sides 28 and 32 of the tubular member 20 so as to be in substantial longitudinal alignment with the first and second blade slots 26 and 30, respectively. Aperture 38 is disposed in the side 28 of the tubular member 20 so as to be spatially disposed from the aperture 34 and in substantial longitudinal alignment with the first blade slot 26, and thus the aperture 34.

The handle 12 of the hand saw 10 further comprises an end closure member 40 supported by the second end 24 of the tubular member 20. As more clearly shown in FIGS. 6, 7A and 7B, the end closure member 40 is provided with a hollow cylindrical-shaped body portion 42 and a cylindrical-shaped shoulder 44 having an axial hole 46 extending therethrough. The cylindrical-shaped body portion 42 of the closure member 40 is disposed within the second end 24 of the tubular member 20 such that the shoulder 44 of the closure member 40 abuts the tubular member 20. The body portion 42 of the closure member 40 can be secured within the second end 24 of the tubular member 20 by frictional engagement with the interior wall portion of the tubular member 20, or by the use of a suitable adhesive material.

Referring now to FIGS. 1, 2, 4A and 4B, the back bar 14 comprises an elongated tubular member 50 which has the same general cross sectional formation as the tubular member 20 of the handle 12, but which, as previously stated, has an outside diameter less than the inside diameter of the tubular member 20 of the handle 12 so that the tubular member 50 of the back bar 14 is partially receivable in the hollow of the tubular member 20 of the handle 12 when the saw 10 is in the storage mode. The elongated tubular member 50 of the back bar 14 is characterized as having a first end 52, an opposing second end 54, an upper side 56 and a lower side 58. The first end 52 of the tubular member 50 is configured with a concave groove (substantially as shown in FIGS. 1, 4A and 4B) for mating abutment with a portion of the tubular member 20 of the handle 12 when the saw 10 is in the assembled working mode. A longitudinally extending back bar blade slot 60 is formed in the lower side 58 of the tubular member 50 at the second end 54 thereof. The length of the back bar blade slot 60 can vary widely depending upon the length of the tubular member 20 of the handle 12, the length of the tubular member 50 of the back bar 14, the length of the saw blade 16 and the angular disposition of the saw blade 16 as same spans between the handle 12 and the back bar 14 when the hand saw 10 is in the assembled working mode. However, the length of the back bar blade slot 60 should be greater than the height of the saw blade 16 to insure proper connection of the saw blade 16 to the tubular member 50 of the back bar 14 via the back bar blade slot 60 as will be explained in more detail hereinafter.

When a commercially available 19 inch saw blade is employed as the saw blade 16 of the hand saw 10, the length of the tubular member 20 of the handle 12, the length of the back bar 14, the length of the first and second blade slots 26, 30 formed in the first end of the tubular member 20 and the length of the back bar slot 60 formed in the lower side 58 of the tubular member 50 are critical in order to secure the saw blade 16 in a rigid cutting position and prevent same from buckling. Thus, when employing a 19 inch saw blade the length of the tubular member 20 of the handle 12 should be 17¼ inches, the length of the back bar member 14 should be 10½ inches, the length of the first and second blade slots 26, 30 should be 1¼ inches and 13/16 inch, respectively, and the length of the back bar slot 60 should be 1⅝ inches. Further, the apertures 34, 36 are disposed about 1 inch from the second end 24 of the tubular member 20 of the handle 12; and aperture 38 is disposed about 2¼ inches from the second end 24 of the tubular member 20 of the handle 12.

The tubular member 50 of the back bar 14 is further provided with a plurality of apertures 62, 64 and 66 disposed near the concave first end 52 thereof. Apertures 62 and 64 are spatially disposed in axial alignment on the upper and lower sides 56 and 58, respectively, of the tubular member 50; and aperture 66 is disposed in the upper side 56 of the tubular member 50 so as to be in a spatial, aligned relationship with the aperture 62 substantially as shown. The aperture 64 is disposed in the concave first end 52 of the tubular member 50 so as to be in substantially longitudinal alignment with the back bar blade slot 60. When utilizing a 19 inch saw blade as the saw blade 16 of the hand saw 10, the apertures 62, 64 are disposed about ⅜ inch from the concave first end 52 of the tubular member 50 of the back bar 14; and the aperture 66 is disposed about 2⅞ inches from the concave first end 52 of the tubular member 50.

The back bar 14 of the hand saw 10 further comprises an end closure member 68 supported by the second end 54 of the tubular member 50. As more clearly shown in FIGS. 4A, 4B and 5, the end closure member 68 is provided with a hollow cylindrical-shaped body portion 70 and a cylindrical-shaped shoulder 72 having a hole 74 extending therethrough. The hole 74 is desirably disposed in the shoulder 72 so as to be off-center as shown. A slot 76 is disposed in the body portion 70 and the shoulder 72 of the end closure member 68 so as to extend the length thereof and intersect the hole 74 in the shoulder 72. The cylindrical-shaped body portion 70 of the end closure member 68 is disposed within the second end 54 of the tubular member 50 so that the shoulder 72 abuts the tubular member 50 and the slot 76 in the body portion 70 and the shoulder 72 of the end closure member 68 is aligned with and openly communicates with the back bar blade slot 60 of the tubular member 50. Thus, one end of the saw blade 16 can be disposed within the back bar blade slot 60 via the hole 74 and the slot 76 in the end closure member 68 so that the saw blade can be secured to the back bar 14 of the saw 10 when same is in the assembly position. The body portion 70 of the end closure member 68 can be secured within the second end 54 of the tubular member 50 by frictional engagement with the interior wall portion of the tubular member 20, or by the use of a suitable adhesive material.

Figure 3A:
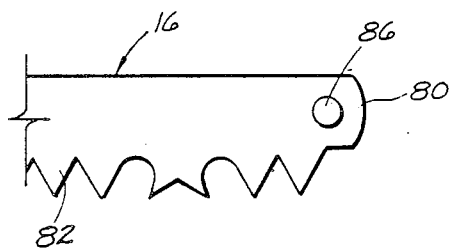
FIG. 3A is an enlarged, fragmental, side view of one end of a saw blade for cutting wood.
Figure 3B:
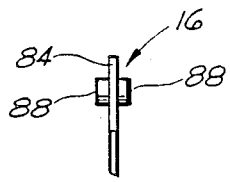
FIG. 3B is an end view of the other end of the saw blade of FIG. 3A.
Figure 3C:
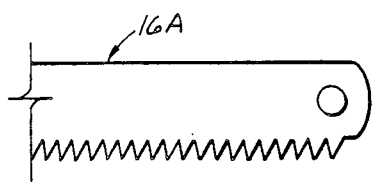
FIG. 3C is an enlarged, fragmental, side view of one end of a saw blade for cutting meat; and, FIG. 3D is an enlarged, fragmental, side view of one end of a saw blade for cutting metal.
Figure 3D:
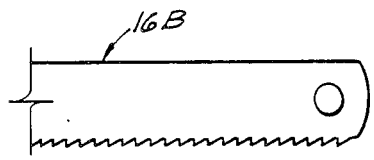

The saw blade 16, 16a and 16b of the hand saw 10 are identical in construction with the exception that the saw blade 16 is adapted to cut wood, the saw blade 16a is adapted to cut meat, and the saw blade 16b is adapted to cut metal. Thus, only saw blade 16 illustrated in FIGS. 1, 3A and 3B will be described in detail. Saw blade 16 is characterized as having a first end portion 80, a medial portion 82 and an opposing second end portion 84. In the assembled mode of the hand saw 10, the first end portion 80 of the saw blade 16 is connected to the first end 22 of the tubular member 20 of the handle 12 of the hand saw 10 and the opposed second end portion 84 of the saw blade 16 is connectable to the second end 54 of the tubular member 50 of the back bar 14 such that the medial portion 82 of the saw blade 16 spans therebetween substantially as shown in FIG. 1. In order to secure the first and second ends 80, 84 to the first end 22 of the tubular member 20 of the handle 12 and the second end 54 of the tubular member 50 of the back bar 14, a first blade stop assembly 86 is connected to the first end portion 80 of the saw blade 16 so as to extend outwardly from each side of the saw blade 16; and a second blade stop assembly 88 is connected to the second end portion 82 of the saw blade 16 so as to extend outwardly from each side of the saw blade 16. Thus, in the assembled working mode of the hand saw 10, the first end portion 80 of the saw blade 16 is positioned within the first and second blade slots 26 and 30 formed in the first end of the tubular member 20 of the handle 12 such that the first blade stop assembly 86 frictionally engages and is supported by an exterior wall portion of the tubular member 20 defining the second blade slot 30; whereas the second end portion 84 of the saw blade 16 supporting the second blade stop assembly 88 is positioned within the back bar blade slot 60 formed in the second end 54 of the tubular member 50 of the back bar 14 (via passage of the second blade stop assembly through the hole 74 in the end closure member 68 and the adjacently disposed portion of the second end portion 84 of the saw blade through the intersecting slot 76 of the closure member 68) such that the second blade stop asembly 88 frictionally engages and is supported by an interior wall portion of the tubular member 50 defining the back bar blade slot 60.

As previously stated, the hand saw 10 of the present invention is provided with the hook retainer assembly 18 for connecting the handle 12 to the back bar 14 when the hand saw 10 is in either the assembled working mode or the collapsed storge mode. When the hand saw 10 is in the working mode the hook retainer assembly 18 is disposed through the axially aligned apertures 34, 36 of the tubular member 20 of the handle 12 so as to engage the tubular member 50 of the back bar 14 via the aperture 66 in the upper side 56 of the tubular member 50. Thus, the hook retainer assembly 18, in combination with the tension of spanning the saw blade 16, secures the handle 12 and the back bar 14 in a stable, working positon as illustrated in FIG. 1.

In the storage mode of the hand saw 10, the first end 52 of the tubular member 50 of the back bar 14 is partially telescopically disposed within the hollow of the tubular member 20 of the handle 12 via the first end 20 thereof so that the third aperture 38 in the tubular member 20 of the handle 12 is aligned with one of the first and second axially aligned apertures 62, 64 in the tubular member 50 of the back bar 14. The hook retainer assembly 18 is then positioned through the axial hole 46 in the closure member 40 of the handle 12 so that the hook retainer assembly 18 abuts the closure member 40. A portion of the hook retainer assembly 18 extends through the tubular member 20 of the handle 12 and engages the aligned aperture 38 of the tubular member 20 of the handle 12 and one of the axially aligned apertures 62, 64 in the tubular member 50 of the back bar 14 so as to secure the handle 12 and the back bar 14 in a stable, secure storage position as illustrated in FIG. 2.

Referring now to FIGS. 1, 2, 8 and 9, the hook retainer assembly 18 of the hand saw 10 comprises a hook retainer member 90 and a connector assembly 92. The hook retainer member 90 is provided with a hook end portion 94, an elongated body portion 96 and a threaded distal end portion 98. The connector assembly 92 threadably engages the threaded distal end portion 98 of the hook retainer member 90 to secure the tubular member 20 of the handle 12 to the tubular member 50 of the back bar 14 when the hand saw 10 is in the assembled working mode or the collapsed storage mode. The hook end portion 94 of the hook retainer member 90 is disposed substantially normal to the adjacent portion of the elongated body portion 96 so that the hook retainer member 90 is provided with a substantially L-shaped configuration. The length of the hook end portion 94 can vary widely, but will generally be provided with a length substantially equal to the interior radius of the tubular member 20 of the handle 12. Thus, the hook end portion 94 of the hook retainer member 90 can be readily extended through the tubular member 20 of the handle 12 to engage the aperture 38 in the tubular member 20 of the handle 12 and one of the aligned apertures 62, 64 in the tubular member 50 of the back bar 14 when the hand saw 10 is positioned in the storage mode.

In order to enhance the engagement of the hook end portion 94 of the hook retainer member 90 with the tubular member 20 of the handle 12 and the tubular member 50 of the back bar 14 (when the hand saw 10 is in either the assembled working mode or the collapsed storage mode), a bend is provided in the elongated body portion 96 of the hook retainer member 90 substantially as shown in FIG. 8. By providing the bend in the elongated body portion 96 of the hook retainer member 90 a proper connection is insured between the hook retainer member 90 and the tubular members 20 and 50 of the handle 12 and the back bar 14 when the hand saw 10 is in either the assembled working mode or the collapsed storge mode. In other words, when the hand saw 10 is in the assembled working mode (e.g. the saw blade spans between and is connected to the first end 22 of the tubular member 20 of the handle 12 and to the second end 54 of the tubular member 50 of the back bar 14 as heretofore described) the elongated body portion 96 of the hook retainer member 90 is positioned through the axially aligned apertures 34, 36 in the second end 24 of the tubular member 20 such that the hook end portion 94 of the hook retainer member 90 extends through the aperture 66 in the tubular member 50 of the back bar 14, and the threaded distal end portion 98 of the hook retainer member 90 extends outwardly from the tubular member 20 of the handle 12. Thereafter, by securing the hook retainer member 90 in the connected position by engagement of the connector assembly 92 to the threaded distal end portion 98 of the hook retainer member 90, in combination with the saw blade 16, the hand saw 10 is assembled in a stable, working mode.

On the other hand, when the hand saw 10 is in the collapsed storage mode (e.g. the tubular member 50 of the back bar 14 is partially disposed in the hollow of the tubular member 20 of the handle 12 such that one of the axially aligned apertures 62, 64 in the first end 52 of the tubular member 50 of the back bar 14 is aligned with the aperture 38 in the tubular member 20 of the handle 12) the elongated body portion 96 of the hook retainer member is disposed within the second end 24 of the tubular member 20 of the handle 12 via the axial hole 46 in the closure member 40 such that the hook end portion 94 engages the tubular member 20 and 50 via the aligned aperture 38 in the tubular member 20 and one of the aligned apertures 62, 64 in the tubular member 50, and the threaded distal end portion 98 of the hook retainer 90 extends outwardly from the closure member 40. Thereafter, by securing the hook retainer member 90 in the connected position by engagement of the connector assembly 92 to the threaded distal end portion 98 of the hook retainer member 90, the hand saw 10 is secured in the collapsed storage mode.

It should be noted that when the hand saw 10 is in the storage, collapsed position, the saw blades 16, 16a and 16b are stowed in the hollow of the connected tubular members 20 and 50 of the handle 12 of the back bar 14 substantially as illustrated by phantom lines in FIG. 2. Further, it should be noted that one advantage of the hand saw 10 of the present invention is that a plurality of saw blades, such as saw blades 16, 16a and 16b can be stowed in the hand saw 10 when same is in the collapsed storage mode. The ability to store a plurality of saw blades provides the hand saw 10 with versatility and enables the hand saw 10 to be used for multi-purposes, such as cutting wood, meat or metal.

The connector assembly 92 employed in combination with the hook retainer member 90, to secure the tubular member 20 of the handle 12 to the tubular member 50 of the back bar 14 when the hand saw 10 is in either the assembled working mode or the collapsed storage mode comprises a base portion 100 and a ring element 102. The base portion 100 of the connector assembly 98 (which abuttingly engages the closure member 40 of the handle 12 when the hand saw 10 is in the collapsed, storage mode and an exterior portion of the handle member 12 adjacent the aperture 36 when the hand saw 10 is in the assembled working mode) is provided with an axially disposed threaded bore 104 extending therethrough for threadingly engaging the threaded distal end portion 98 of the hook retainer member 90. The ring element 102, which facilitates the carrying or storage of the hand saw 10 when saw is in the collapsed storage mode, is connected to the base portion 100 so as to extend outwardly therefrom substantially as shown in the drawings. The ring element 102 permits the user to more readily store the hand saw 10 in a tool area, or, if desired, to secure the hand saw 10 to a belt of the user when back-packing, hunting, camping and the like.

In using the hand saw 10 of the present invention, let it be assumed that the saw 10 is in the collapsed storage mode as shown in FIG. 2. The ring element 102 of the connector assembly 92 is grasped firmly with the hand and rotated in a counter-clockwise direction so as to loosen the base portion 100 (or remove same) on the threaded distal end portion 98 of the hook retainer member 90. Thereafter, the hook end portion 94 of the hook retainer member 90 is disengaged from the tubular members 20, 50 of the handle 12 and the back bar 14, respectively, by withdrawing the hook end portion 94 from the aligned apertures within the tubular members 20 and 50. The tubular member 50 of the back bar 14 is then removed from the tubular member 20 of the handle 12 so that the saw blades stored therein can be removed and the proper saw blade 16 selected. The base portion 100 of the connector assembly 92 is then, if not having been previously, removed from the threaded distal end portion 98 of the hook retainer member 90.

The second end portion 84 of the saw blade 16 is then positioned within the back bar blade slot 60 formed in the lower side 58 of the tubular member 50 of the back bar 14 via the hole 74 and the slot 76 formed in the end closure member 68 such that the second end portion 84 of the saw blade 16 is secured within the back bar blade slot 60 by the second blade stop assembly 88. The first end portion 80 of the saw blade 16 is thereafter positioned within the first and second blade slots 26, 30 formed in the first end 22 of the tubular member 20 of the handle 12 such that the first blade stop assembly 86 engages the exterior portion of the tubular member 20 defining the second blade slot 30 therein.

The concave-shaped first end 52 of the tubular member 50 of the back bar 14 is then abutted against the tubular member 20 of the handle 12 at a position below the axially aligned apertures 34, 36 formed near the second end of the tubular member 20 of the handle 12. While supporting the back bar 14 and the handle 12 so that the back bar 14 abuttingly engages the handle 12, the elongated body portion 96 of the hook retainer member 90 is positioned through the aligned apertures 34, 36 in the tubular member 20 of the handle 12 and the hook end portion 94 is disposed through the aperture 66 formed in the upper side 56 of the tubular member 50 of the back bar 14. While stabilizing the hook end portion 94 of the hook member 90 in the aperture 66 of the tubular member 50, the base portion 100 of the connector assembly 92 is threadingly disposed on the threaded distal end portion 98 of the hook retainer member 90 until the hook retainer member 90 is drawn into a rigid, stable secure position.

To collapse the hand saw 10, the ring element 102 of the connector assembly 98 is grasped and the connector assembly 92 is rotated in a counter-clockwise direction until the connector assembly 92 has been loosened sufficiently on the threaded distal end portion 98 of the hook retainer member 90 to permit the hook end portion 94 of the hook retainer member 90 to be withdrawn from the aperture 66 in the upper side 56 of the tubular member 50 of the back bar 14. The saw blade 16 is then removed from the first and second blade slots 26, 30 of the tubular member 20 of the handle 12 and the back bar blade slot 60 of the tubular member 50 of the back bar 14. The hook retainer member 90 is then removed from the axially aligned apertures 34, 36 of the tubular member 20 of the handle 12. The saw blades 16 are then positioned within the hollow of the tubular member 20 of the handle 12 and the first end 52 of the tubular member 50 of the back bar 14 is positioned within the tubular member 20 of the handle 12 a selected distance so that one of the axially aligned apertures 62, 64 of the tubular member 50 of the back bar 14 is aligned with the aperture 38 of the tubular member 20 of the handle 12. The hook end portion 94 of the hook retainer member 90 is thereafter inserted through the axial hole 46 of the closure member 40 connected to the second end of the tubular member 20 of the handle 12 so that the elongated body portion 96 of the hook retainer member 90 extends through a portion of the tubular member 20, and the hook end portion 94 is positioned through one of the aligned apertures 64, 66 of the tubular member 50 of the back bar 14 and the aperture 38 of the tubular member 20 of the handle 12. The connector assembly 92 is thereafter threadingly connected via the threaded bore 104 therein to the threaded distal end portion 98 of the hook retainer member 90, (which extends outwardly from the closure member 40) until the base portion 100 of the connector assembly 92 securely abuts the shoulder 44 of the closure member 40 and secures the hook retainer member 90 in a stable position.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. A multi-purpose saw selectively positionable in one of an assembled working mode and a storage mode, said saw comprising:

a hollow handle having opposing first and second ends, the handle further characterized as having a first blade slot formed in the first end on one side thereof and a second blade slot formed in the first end on the opposing side thereof, said first and second blade slots longitudinally aligned with the second blade slot having a length less than the first blade slot, said handle further having a plurality of apertures disposed near the second end thereof, a pair of said apertures being spatially disposed in axial alignment on opposing sides of the handle and in substantial longitudinal alignment with the first and second blade slots, a third of said apertures being disposed on one side of the handle in substantial longitudinal alignment with the first blade slot;

a hollow back bar having opposing first and second ends, and upper and lower sides, the first end being configured with a concave groove for mating abuttment with a portion of the handle when the saw is in the assembled working mode, the back bar partially receivable in the hollow of the handle in the storage mode of the saw, said back bar further characterized as having a back bar blade slot formed in the lower side of the back bar at the second end thereof, and as having a plurality of apertures disposed near the concave first end thereof, a pair of said apertures being axially disposed in the upper and lower sides of the back bar, a third of said apertures being disposed in the upper side of the back bar and in substantial longitudinal alignment with the back bar blade slot;

a saw blade having a first end portion, a medial portion and an opposed second end portion, in the assembled working mode of the saw the first end portion of the saw blade positionable within the first and second blade slots of the handle and the opposed second end portion of the saw positionable within the back bar blade slot of the back bar;

blade stop means supported by the first and second end portions of the saw blade for preventing passage of the first and second end portions of the saw blade through the first and second blade slots of the handle and through the back bar blade slot of the back bar so that the medial portion of the saw blade spans between the first end of the handle and the second end of the back bar when the saw is in its assembled working mode; and, hook retainer means for interconnecting the handle and back bar together, in the saw working mode the hook retainer means being disposed through the axially aligned pair of apertures formed in the handle and engaging the back bar via the third aperture in the upper side thereof such that the hook retainer means, in combination with the tension of spanning the saw blade, secures the handle and back bar in a stable position, and in the storage mode the first end of the back bar being telescopically disposed within the hollow of the handle such that the third aperture in the handle is axially aligned with one of the first and second axially aligned apertures in the back bar such that a portion of the hook retainer means is disposed to engage the aligned third aperture of the handle and one of the first and second apertures of the back bar and to engage the first end of the handle so that the handle and back bar are secured together in the storage mode.

2. The multi-purpose saw of claim 1 wherein the hook retainer means comprises:
- a hook retainer member having a hook end portion, an elongated body portion and a threaded distal end portion, the body portion having a bend therein so as to facilitate connection of the hook end portion to the back bar via the third aperture thereof when the saw is in the working mode and to facilitate connection of the hook end portion to the handle and the back bar via the aligned third aperture in the handle and one of the first and second axially aligned apertures of the back bar when same are in the storage mode; and,
- a connector assembly having an axially disposed threaded bore extending therethrough for threadingly engaging the threaded distal end portion of the hook retainer member, the connector assembly abuttingly engaging the second end of the handle when the saw is in the storage mode, and the connector assembly abuttingly engaging the handle when the saw is in the working mode.

3. The multi-purpose saw of claim 2 wherein the connector assembly of the hook retainer means comprises a base portion having the threaded bore extending therethrough and a ring element connected to the base portion so as to extend outwardly therefrom.

4. The multi-purpose saw of claim 3 further comprising:
- a first closure member disposed within the second end of the handle for closing the second end thereof, the first closure member having an axial hole extending therethrough adapted to receive the hook retainer member when the saw is in the storage mode; and,
- a second closure member disposed within the second end of the back bar for closing the second end thereof, the second closure member having a hole extending therethrough and an intersecting slot, the intersecting slot of the second closure member being aligned with and openly communicating with the back bar blade slot of the back bar.

5. The multi-purpose saw of claim 4 wherein the blade stop means comprises:
- a first blade stop member connected to the first end portion of the saw blade so as to extend outwardly from each side of the saw blade, the first blade stop member adapted to frictionally engage an exterior portion of the handle defining the second blade slot for securing the first end portion of the saw blade within the first and second blade slots of the handle; and,
- a second blade stop member connected to the second end portion of the saw blade so as to extend outwardly from each side of the saw blade, the second blade stop member adapted to frictionally engage an interior wall portion of the back bar defining the back bar blade slot for securing the second end portion of the saw blade within the back bar blade slot of the back bar.

6. A multi-purpose saw selectively positionable in one of an assembled working mode and a storage mode, said saw comprising:
- an elongated, tubular handle member having opposing first and second ends, the handle member further characterized as having a first blade slot formed in the first end on one side thereof and a second blade slot formed in the first end on the opposing side thereof, said first and second blade slots longitudinally aligned with the second blade slot having a length less than the first blade slot, said handle member further having a plurality of apertures disposed near the second end thereof, a pair of said apertures being spatially disposed in axial alignment on opposing sides of the handle member and in substantial longitudinal alignment with the first and second blade slots, a third of said apertures being disposed on one side of the handle member in substantial longitudinal alignment with the first blade slot;
- an elongated, tubular back bar member having opposing first and second ends, and upper and lower sides, the first end being configured with a concave groove, for mating abuttment with a portion of the handle member when the saw is in the assembled working mode, the back bar member having an outside diameter less than the inside diameter of the hollow handle member such that the back bar member is partially receivable in the hollow of the handle member in the storage mode of the saw, said back bar further characterized as having a back bar blade slot formed in the lower side of the back bar member at the second end thereof, and as having a plurality of apertures disposed near the concave first end thereof, a pair of said apertures being axially disposed in the upper and lower sides of the back bar member, a third of said apertures being disposed in the upper side of the back bar member and in substantial longitudinal alignment with the back bar blade slot;
- a first closure member disposed within the second end of the handle member for closing the second end thereof, the first closure member having an axial hole extending therethrough;
- a second closure member disposed within the second end of the back bar member for closing the second end thereof, the second closure member having a hole extending therethrough and an intersecting slot extending from the hole to a side of the second closure member so that the intersecting slot of the second closure member is aligned with and in open communication with the back bar blade slot of the back bar member;
- a saw blade having a first end portion, a medial portion and an opposed second end portion, in the assembled working mode of the saw the first end portion of the sawblade positionable within the first and second blade slots of the handle member and the opposed second end portion of the saw positionable within the back bar blade slot of the back bar member via the hole and intersecting slot of the second closure member;

blade stop means supported by the first and second end portions of the saw blade for preventing passage of the first and second end portions of the saw blade through the first and second blade slots of the handle member and through the back bar blade slot of the back bar member so that the medial portion of the saw blade spans between the first end of the handle member and the second end of the back bar member when the saw is in its assembled working mode;

hook retainer means for interconnecting the handle and back bar members together, in the saw working mode the hook retainer means being disposed through the axially aligned pair of apertures formed in the handle member and engaging the back bar member via the third aperture in the upper side thereof such that the hook retainer means, in combination with the tension of spanning the saw blade, secures the handle and back bar members in a stable position, and in the storage mode the first end of the back bar member being telescopically disposed within the hollow of the handle member such that the third aperture in the handle member is axially aligned with one of the first and second axially aligned apertures in the back bar member such that upon positioning the hook retainer means through the axial hole of the first closure member, a portion of the hook retainer means engagingly abuts the first closure member while permitting a second portion of the hook retainer means to engage the aligned third aperture of the handle member and one of the first and second apertures of the back bar member so that the handle and back bar members are secured together in the storage mode.

7. The multi-purpose saw of claim 6 wherein the blade stop means comprises:

a first blade stop member connected to the first end portion of the saw blade so as to extend outwardly from each side of the saw blade in a direction substantially perpendicular to the elongated axis of the saw blade such that the first blade stop member selectively engages the portion of the handle member defining the second blade slot and stabilizes the first end portion of the saw blade within the first and second blade slots of the handle member; and, a second blade stop member connected to the second end portion of the saw blade so as to extend outwardly from each side of the saw blade in a direction substantially perpendicular to the elongated axis of the saw blade, the second blade stop member positionable through the hole of the second closure member as the saw blade is positionable through the intersecting slot thereof such that the second blade slot member selectively engages an interior wall portion of the back bar member defining the back bar slot and stabilizes the second end portion of the saw blade in the back bar slot.

8. The multi-purpose saw of claim 7 wherein the hook retainer means comprises:

a hook retainer member having a hook end portion, a substantially longitudinal body portion and a threaded distal end portion, the hook end portion being disposed substantially normal to the elongated axis of the longitudinal body portion, the hook end portion of the hook retainer member connectable to the back bar member via the third aperture thereof when the saw is in the working mode and connectable to the handle member and the back bar member via the aligned third aperture in the handle member and one of the first and second aligned apertures in the back bar member when same are in the storage mode; and, a connector assembly having an axially disposed threaded bore extending therethrough for threadingly engaging the threaded distal end portion of the hook retainer member, the connector assembly abuttingly engaging the second end of the handle member when the saw is in the storage mode, and the connector assembly abuttingly engaging the handle member when the saw is in the working mode.

9. The multi-purpose saw of claim 8 wherein the connector assembly of the hook retainer means comprises a base portion having the threaded bore extending therethrough and a ring element connected to the base portion so as to extend outwardly therefrom.

10. The multi-purpose saw of claim 9 wherein the longitudinal body portion of the hook retainer member is provided with a bend therein.

* * * * *